Figure 1:
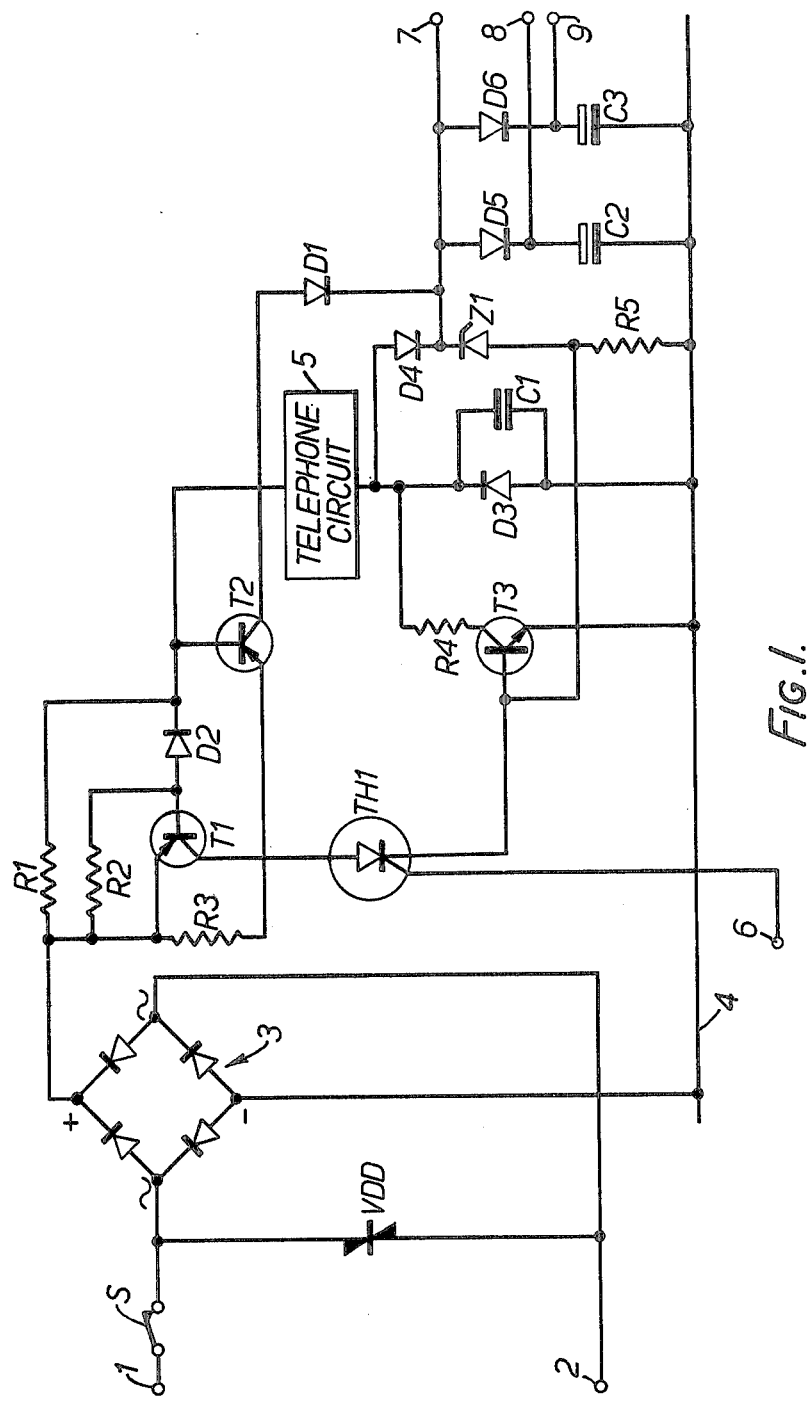

United States Patent [19]

Secrett et al.

[11] 4,197,425
[45] Apr. 8, 1980

[54] POWER SUPPLY CIRCUIT FOR A SUBSCRIBER'S TELEPHONE SET

[75] Inventors: Malcolm R. Secrett, Sutton; Allan Jackson, Sevenoaks, both of England

[73] Assignee: The Post Office, London, England

[21] Appl. No.: 932,695

[22] Filed: Aug. 10, 1978

[30] Foreign Application Priority Data

Aug. 10, 1977 [GB] United Kingdom ............... 33502/77

[51] Int. Cl.² ........................................... H04M 19/00
[52] U.S. Cl. .................................. 179/2 BC; 179/77; 179/81 R
[58] Field of Search ............... 179/2 BC, 2.5 R, 16 A, 179/16 AA, 81 R, 77; 320/39, DIG. 1, DIG. 2, 1

[56] References Cited

U.S. PATENT DOCUMENTS

| | | | |
|---|---|---|---|
| 3,278,823 | 10/1966 | Ross | 320/39 |
| 3,436,639 | 4/1969 | Burkett et al. | 320/39 |
| 3,454,860 | 7/1969 | Burkett et al. | 320/DIG. 2 |
| 3,530,366 | 9/1970 | Schwarm | 322/90 |
| 4,096,439 | 6/1978 | Hochstein | 320/1 |

FOREIGN PATENT DOCUMENTS 1301852  1/1973  United Kingdom ...................... 320/39

Primary Examiner—Bernard Konick
Assistant Examiner—Joseph A. Popek
Attorney, Agent, or Firm—Mason, Fenwick & Lawrence

[57] ABSTRACT

A power supply circuit for providing a local power supply replenished from the exchange for a telephone instrument. An electrical energy storage device is connected in parallel with an impedance by a device providing a unidirectional transfer of electrical energy from a direct current path through the impedance. A by-pass circuit is connected in parallel with the impedance. The impedance is a zener diode, the storage device is a capacitor, the unidirectional transfer device is a diode, and the by-pass circuit is a transistor responsive to the state of charge of the capacitor. A trickle charge circuit is connected to transfer energy to the capacitor irrespective of the by-pass circuit and a speech-frequency by-pass circuit is in parallel with the zener diode. A switch responsive to on-hook/off-hook conditions is used to confine energy storage to off-hook periods.

12 Claims, 2 Drawing Figures ns 1 and 2 to which the A-leg and B-leg of an incoming telephone line (not shown) are respectively connected. Terminal 1 is connected to one side of a relay contact S and a voltage dependent device VDD is connected between the other side of contact 5 and terminals 2 as a safeguard against voltage surges on the line. The

POWER SUPPLY CIRCUIT FOR A SUBSCRIBER'S TELEPHONE SET

This invention relates to power supply circuits.

It is known to provide a power supply containing an electrical storage device "trickle-charged" from a power source at a remote location. For example, it has been proposed to charge a secondary cell or a storage capacitor provided in the circuit of a telephone instrument by current supplied over the two-wire line from the exchange. It is well known that direct current flow in the line is used for signalling purposes and therefore current used for charging purposes must be prevented from appearing to be a signalling current. Practically, this means that a trickle-charging current of no more than a few milliamps can be supplied over the line. This arrangement is not entirely satisfactory since, if the telephone instrument in question is used extensively, more power may be taken from the local storage device than can be supplied by the exchange in the time available. Telephone call-boxes, for example, may be subjected to such extensive use because they are available to the general public rather than merely to the subscriber and persons with whom he/she is associated.

It is an object of the invention to provide an improved power supply circuit.

The present invention provides a power supply circuit comprising:

first and second terminals for connection to a source of electrical power, a direct current path connected from the first to the second terminals and including impedance means, an electrical energy storage device connected in parallel with the impedance means by means providing a unidirectional transfer of electrical energy from the direct current path, a by-pass circuit connected in parallel with the impedance means to selectively by-pass direct current around the impedance means, and power output terminals connected to the electrical storage device.

Such a power supply circuit can be used in a telephone instrument for providing a local power supply replenished from the exchange. In this case, the by-pass circuit can by-pass current for most of the time the telephone instrument is in use but can assume a non-by-pass condition for short periods to allow the electrical storage device to take in electrical energy. These periods can be kept sufficiently short not to interfere with the ordinary operation of the telephone instrument.

The impedance means can comprise a zener diode.

The electrical energy storage device can comprise an electrolytic capacitor.

The means providing a unidirectional transfer of energy can comprise a diode.

The by-pass circuit can comprise a transistor responsive, in use, to the state of charge of the electrical energy storage device.

The by-pass circuit can additionally have a control input to over-ride its response to the state of charge of the electrical energy storage device.

A trickle-charger circuit can be connected to transfer energy to the electrical storage device irrespective of the condition of the by-pass circuit.

A speech-frequency by-pass circuit can be connected in parallel with the impedance means.

Figure 2:
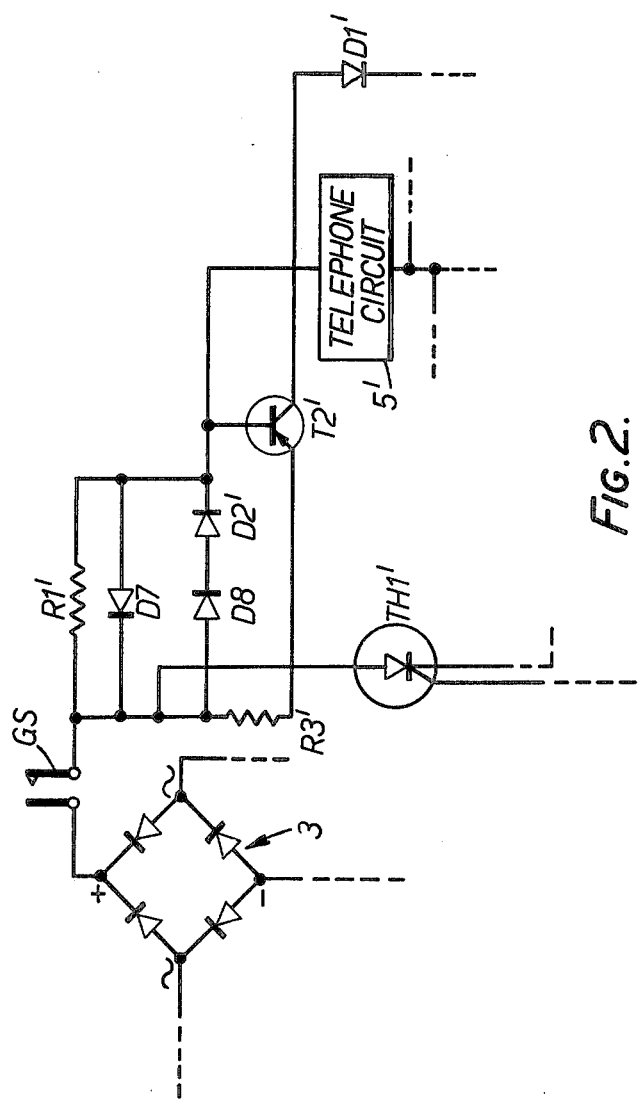

By way of example only, an illustrative embodiment of the invention will now be described with reference to the accompanying drawings in which:

FIG. 1 shows the circuit diagram of a power supply circuit embodying the invention, and FIG. 2 shows a modification to the circuit of FIG. 1.

Referring to the drawing, a power supply circuit for a telephone call-box is illustrated and has input terminals 1 and 2 to which the A-leg and B-leg of an incoming telephone line (not shown) are respectively connected. Terminal 1 is connected to one side of a relay contact S and a voltage dependent device VDD is connected between the other side of contact 5 and terminals 2 as a safeguard against voltage surges on the line. The other side of contact 5 and terminal 2 are connected to the alternating current inputs of a conventional four-arm diode bridge 3, the negative output of the bridge is connected to a common supply rail 4, and the positive output of the bridge is connected commonly to one end of each of three resistors R1, R2 and R3. The rectifier bridge 3 is employed because it is standard practice in telephone engineering to change line polarity between forward and reverse conditions for signalling purposes.

The other end of resistor R1 is connected to one end of the telephone circuit 5 of the call-box. The positive output of the bridge 3 is also connected to the emitter of a PNP transistor T1, the base of which is connected to the other end of resistor R2. The collector of transistor T1 is connected to the anode of a thyristor TH1, the gate electrode of which is connected to an INHIBIT input terminal 6.

The other end of resistor R3 is connected to the emitter of another PNP transistor T2, the collector of which is connected to the anode of a diode D1. Another diode D2 has its anode connected to the base of transistor T1 and its cathode connected to both the other end of resistor R1 and the base of transistor T2.

The other side of the telephone circuit is commonly connected to one end of a resistor R4, the cathode of a diode D3, one end of a capacitor C1, and the anode of a diode D4. The other end of the resistor R4 is connected to the collector of an NPN transistor T3, the emitter of which is connected to the common rail 4. The anode of the diode D3 and the other end of the capacitor are also connected to the rail 4. The cathode of diode D4 is connected to the cathode of a zener diode Z1, the anode of which is connected to the rail 4 through a resistor R5. The base of transistor T3 is commonly connected to the anode of the zener diode Z1 and the cathode of the thyristor TH1.

The cathode of the diode D1 is connected to the junction of the diode D4 and the zener diode Z1 and to a terminal 7. The anodes of two further diodes D5 and D6 are also connected to the junction of the diode D4 and the zener diode Z1.

The cathodes of diodes D5 and D6 are connected to the positive poles of respective electrolytic capacitors C2 and C3. The negative poles of the capacitors C2 and C3 are both connected to the rail 4.

Output terminals 8 and 9 are connected respectively to the positive poles of capacitors C2 and C3.

A practical example of the circuit illustrated employed the following component values and types:

| bridge 3 | four IN 4005 | T1 | BFT44 |
|---|---|---|---|
| C1 | 2 microfarads | T2 | BFT44 |
| C2 | 100 microfarads | T3 | BC337 |

| -continued | | | |
|---|---|---|---|
| C3 | 470 microfarads | TH1 | BTX18/200 |
| R1 | 10 kilohm | D1-D5 | all type IN4005 |
| R2 | 10 kilohm | Z1 | BZX85 6.8 volts |
| R3 | 270 ohm | | |
| R4 | 10 ohm | | |
| R5 | 10 kilohm | | |

The operation of the circuit will now be explained.

It is assumed that the telephone receiver is initially on-hook and under this condition an open circuit exists between the terminals of the telephone circuit 5. When the user lifts the hand-set of the telephone instrument a DC path exists through the telephone circuit 5 and current flows from the positive terminal of the bridge 3, through resistors R1 and R2, through the telephone circuit 5, through the two parallel paths containing the capacitors C2 and C3 and back to the negative terminal of the bridge. The capacitors C2 and C3 are rapidly (for example, 100 milliseconds) charged by this initial current and the voltage across the series combination of zener diode Z1 and the resistor R5 rises to a value at which the zener diode Z1 starts to conduct. The transistor T3 is now forward biassed (the small current required to maintain it in this state is provided by the constant current circuit defined by transistor T2) and its collector-to-emitter impedance drops to a low value. Current through the telephone circuit 5 now returns to the negative terminal of the bridge 3 through the relatively low resistance by-pass path comprising resistor R4 and transistor T3.

The potential at terminal 7 is taken to logic circuitry (not shown) as an indication of an off-hook condition. The voltage across capacitor C2 is used for powering the logic circuitry and the voltage across capacitor C3 is used for powering various low-current relays (not shown) employed in the telephone call-box. When, owing to the current supplied being in excess of the constant current trickle from T2, the voltage across either capacitor C2 or capacitor C3 falls, the voltage across zener diode Z1 and resistor R5 likewise falls and the zener diode ceases to conduct. Transistor T3 then becomes non-conducting once more and ceases to by-pass current around the capacitors C2 and C3 with the result that the partially discharged capacitor is rapidly re-charged (again, for example, in 100 milliseconds).

It is not convenient that capacitors C2 and C3 should be allowed to take heavy charging currents as and when the need arises since this may interfere with other operations of the circuit. In particular, it is usual to send signals from a coin box by connecting and disconnecting a 5 kilohm loop to line and it is most desirable to prevent heavy re-charging of the capacitors C2 and C3 when this is taking place. Therefore, just before the 5 kilohm loop signalling takes place the logic circuitry (not shown) applies an INHIBIT input to terminal 6.

Since current is flowing through the telephone circuit 5 whilst the hand-set is lifted there is a potential drop across resistor R2 sufficient to turn transistor T1 ON. Thus, when the logic circuitry applies the INHIBIT input to terminal 6 thyristor TH1 is fired and feeds base current to transistor T3 holding it in its ON or by-pass condition. When the 5 kilohm loop signalling is finished, the logic circuitry disconnects the telephone instrument from the line for a short period (such a disconnection is standard practice) by opening the relay contact S. When the contact S opens, the current through thyristor TH1 falls to zero and does not, of course, re-commence when the contact S closes again because the triggering INHIBIT signal will be absent at that time. Similarly, if the hand-set is replaced whilst the thyristor TH1 is ON transistor T1 will be turned OFF and the current through the thyristor will again fall to zero.

Whilst the hand-set is off-hook, transistor T2 is conducting and supplies, by the action of resistor R3, a constant current of 2 milliamps through the diode D1 to trickle-charge the capacitors C2 and C3. When the hand-set is replaced, the base-emitter voltage of transistor T2 falls to zero and no current flows through its collector-emitter path.

The diode D2 is provided in order to set the bias of transistor T2. The diodes D1, D4, D5 and D6 are provided to prevent reverse current flow from the capacitors C2 and C3. The diode D3 is provided to protect against reverse voltages caused by, for example, failure of the bridge 3. The capacitor C1 is provided to give a low impedance path for speech signals.

Although reference has been made to circuitry which is not shown it is not considered necessary to describe this circuitry in more detail for the reason that its only relevance to the illustrated circuit is to make use of the outputs provided by the illustrated circuit and to define the time at which heavy re-charging is to be avoided.

An advantage of the illustrated circuit is that the storage capacitors can re-charge rapidly if heavy currents are drawn from them but because of the shortness of the re-charge period this heavy re-charging does not generally interfere with signalling operations. The trickle-charging current is kept sufficiently low not to interfere with signalling operations either. At critical times, transistors T3 can be turned ON to by-pass current around zener diode Z1 by means of the INHIBIT input to over-ride its response to the state of charge of the capacitors C2 and C3. The fact that transistor T3 most of the time by-passes current around zener diode Z1 avoids the disadvantage of having the voltage drop created by zener diode Z1 permanently connected in circuit.

As explained above, the transistor T1 is turned ON or OFF according to whether the hand-set is lifted or replaced. FIG. 2 shows a modification of the circuit of FIG. 1 in which transistor T1 and resistor R2 are omitted and the tele-springs or gravity switch of the telephone instrument are used to open and close the circuit in response to respectively lifting and replacing the hand-set. In FIG. 2, components which correspond to components of FIG. 1 are given identical but primed reference numerals and broken lines are used to indicate that the circuit continues as in FIG. 1.

The anode of thyristor TH1' is connected to the junction of resistors R1' and R3' and a further diode D8 (type IN4005) is provided in series with diode D2' to replace the base-emitter junction of transistor T1 of FIG. 1. The diodes D8 and D2' are poled in the same direction. A further diode D7 (type IN4005) is connected in anti-parallel with the series combination of diodes D8 and D2'. Resistor R1' is connected to the positive pole of the rectifier 3' through the hand-set actuated gravity switch GS instead of directly as in FIG. 1. The operation of the circuit of FIG. 2 is basically the same as the operation of the circuit of FIG. 1 except that the electronic switching action of transistor T1 is replaced by the electro-mechanical switching action of the gravity switch GS. The gravity switch provides more positive isolation from the line than the transistor switch which could possibly have sufficient leakage current to interfere with line testing.

Various modifications can be made to the illustrated circuit. For example, a secondary cell could be used to store energy in place of an electrolytic capacitor. For some applications, an INHIBIT input may not be required. For some applications, trickle charging may not be required.

What is claimed is:

1. A power supply circuit comprising:
   first and second terminals for connection to a source of electrical power,
   a direct current path connected from the first to the second terminals and including impedance means,
   a speech-frequency by-pass circuit connected in parallel with the impedance means,
   an electrical energy storace device connected in parallel with the impedance means by means providing a unidirectional transfer of electrical energy from the direct current path,
   a by-pass circuit connected in parallel with the impedance means to selectively by-pass direct current around the impedance means, and
   power output terminals connected to the electrical storage device.

2. A circuit as claimed in claim 1, wherein the impedance means comprises a zener diode.

3. A circuit as claimed in claim 1, wherein the electrical energy storage device comprises an electrolytic capacitor.

4. A circuit as claimed in claim 1, wherein the means providing a unidirectional transfer of energy comprises a diode.

5. A circuit as claimed in claim 1, wherein the by-pass circuit comprises a transistor responsive to the state of charge of the electrical energy storage device.

6. A power supply circuit comprising:
   first and second terminals for connection to a source of electrical power,
   a direct current path connected from the first to the second terminals and including impedance means,
   an electrical energy storage device connected in parallel with the impedance means by means providing a unidirectional transfer of electrical energy from the direct current path,
   a by-pass circuit comprising a transistor responsive to the state of charge of the electrical energy storge device connected in parallel with the impedance means to selectively by-pass direct current around the impedance means, said by-pass circuit additionally having a control input to override its response to the state of charge of the electrical energy storage device, and
   power output terminals connected to the electrical storage device.

7. A circuit as claimed in claim 1 wherein a trickle-charger circuit is connected to transfer energy to the electrical storage device irrespective of the condition of the by-pass circuit.

8. A circuit as claimed in claim 1 further comprising a telephone instrument and a telephone exchange, both operatively connected to said circuit, to provide a local power supply replenishable from said exchange.

9. The combination of claim 8, wherein the telephone circuit of the telephone instrument is connected in series with the impedance means.

10. The combination of claim 8, including a switch responsive to the on-hook/off-hook conditions of the telephone instrument to confine energy storage to times when the telephone instrument is off-hook.

11. The combination of claim 10, wherein the switch responsive to the on-hook/off-hook conditions is a transistor switch connected to respond to current flow through the telephone circuit.

12. The combination of claim 10, wherein the switch responsive to the on-hook/off-hook conditions is an electro-mechanical switch actuable by the telephone hand-set and arranged for series connection between the telephone line and the power supply circuit.

* * * * *